Figure 6:
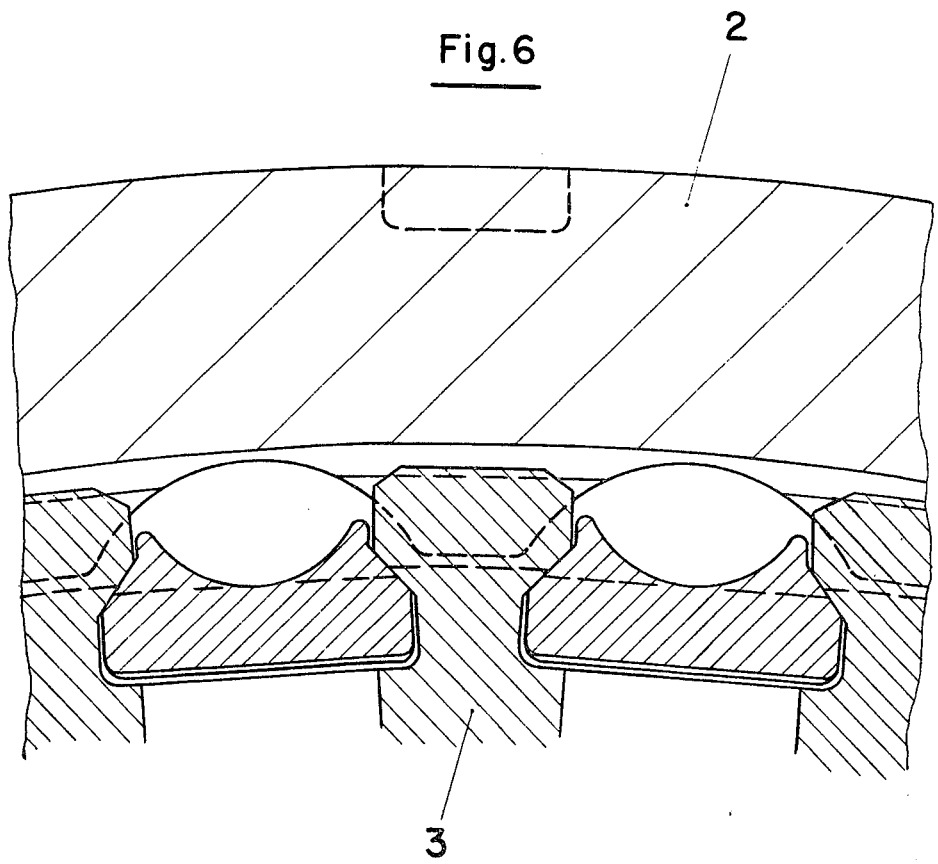

United States Patent [19]

Blank

[11] 4,091,301

[45] May 23, 1978

[54] ROTOR END-WINDING SUPPORT FOR HIGH-SPEED ELECTRICAL MACHINE SUCH AS A TURBO-GENERATOR

[75] Inventor: Karl Blank, Mannheim, Germany

[73] Assignee: BBC Brown Boveri & Company Limited, Baden, Switzerland

[21] Appl. No.: 658,023

[22] Filed: Feb. 13, 1976

Related U.S. Application Data

[63] Continuation of Ser. No. 486,438, Jul. 8, 1974, abandoned.

[51] Int. Cl.² .................................................. H02K 3/46
[52] U.S. Cl. .................................... 310/270; 310/42; 310/262
[58] Field of Search ................. 310/270, 262, 54, 261, 310/264, 269, 58, 59, 64, 260, 65, 265, 42, 43; 336/197

[56] References Cited

U.S. PATENT DOCUMENTS

| | | | |
|---|---|---|---|
| 1,870,056 | 8/1932 | Kropff | 310/262 |
| 2,712,085 | 6/1955 | Willyoung | 310/270 |
| 2,773,210 | 12/1956 | Vogt | 310/270 |
| 2,844,746 | 7/1958 | Coggeshall | 310/270 |
| 3,075,104 | 1/1963 | Willyoung | 310/61 |
| 3,189,769 | 6/1965 | Willyoung | 310/64 |
| 3,393,333 | 7/1968 | Kudlacik | 310/262 |
| 3,395,299 | 7/1968 | Quay | 310/261 |
| 3,427,488 | 2/1969 | Terry | 310/194 |
| 3,476,966 | 11/1969 | Willyoung | 310/270 |

FOREIGN PATENT DOCUMENTS

| | | | |
|---|---|---|---|
| 1,538,754 | 3/1970 | Germany | 310/270 |
| 1,146,185 | 3/1963 | Germany | 310/270 |
| 1,141,021 | 12/1962 | Germany | 310/270 |
| 964,160 | 11/1956 | Germany | 310/270 |

*Primary Examiner*—R. Skudy
*Attorney, Agent, or Firm*—Burns, Doane, Swecker & Mathis

[57] ABSTRACT

A rotor end-winding support for a high-speed electrical machine such as a turbogenerator in the form of an end bell which surrounds the end-winding and comprises two concentric rings. The inner ring made, for example, from a high-strength antimagnetic steel is shrunk into the rotor body and secured against axial displacement. The outer ring, made, for example, from a carbon-fibre-reinforced material or a nonmagnetic e.g. titanium alloy having a high ratio of strength to specific weight, is either shrunk onto the inner ring or expanded hydraulically to permit a slipover fit. The division of the end bell structure into a number of concentrically arranged components makes it possible to use combinations of materials, the respective component rings being allotted functions which correspond to their particular properties.

8 Claims, 11 Drawing Figures

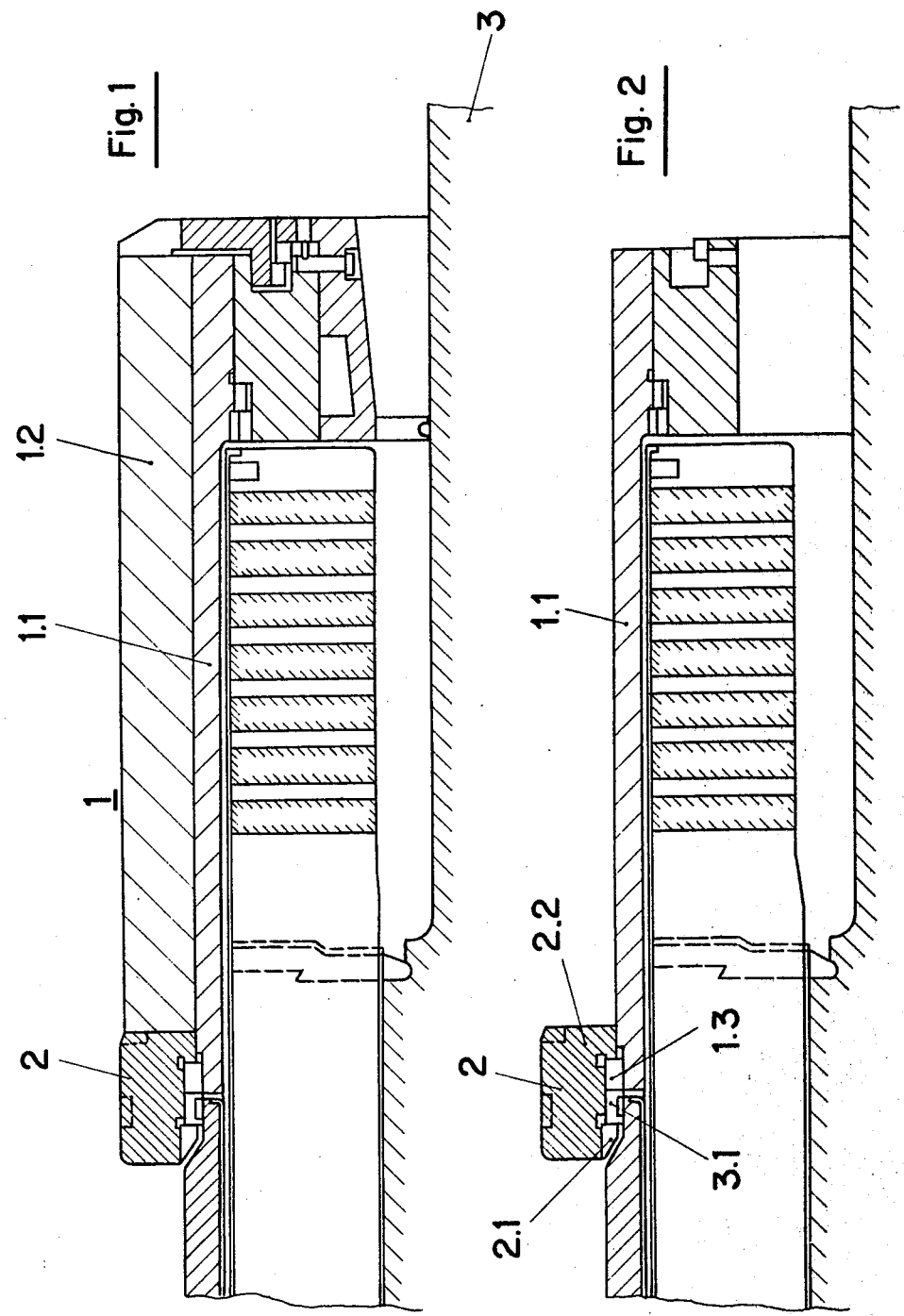

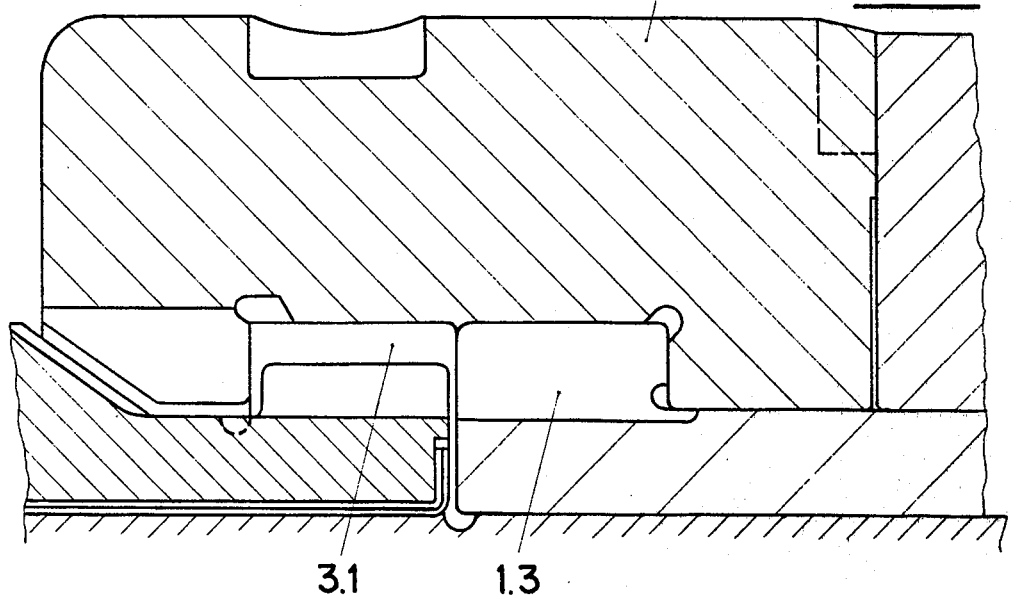
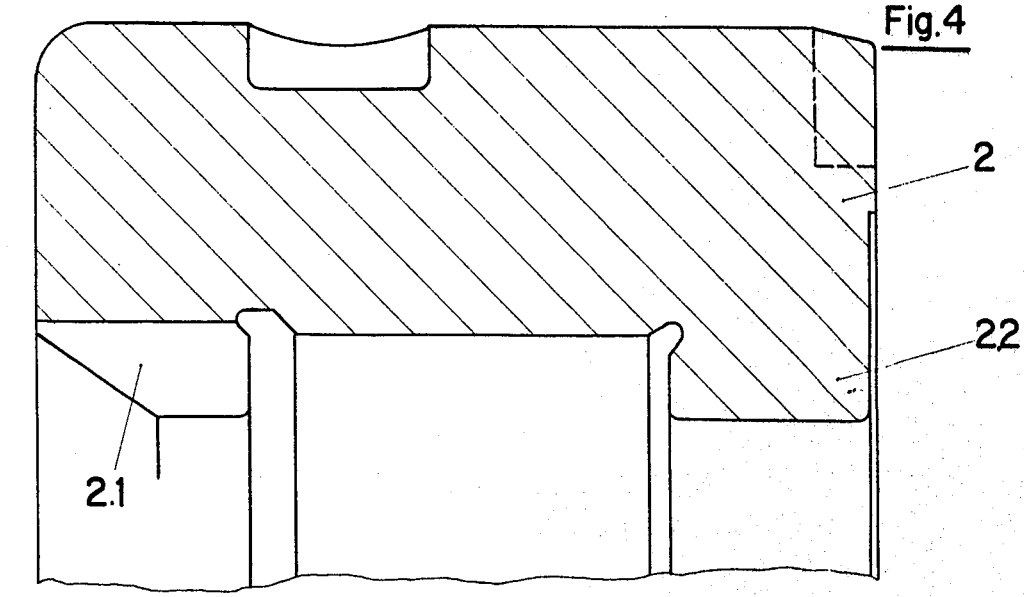
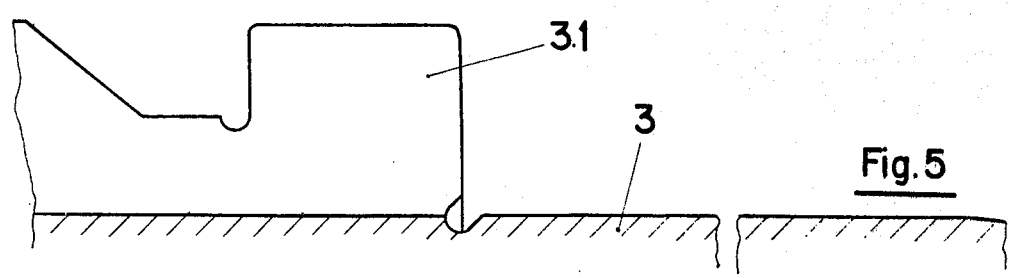

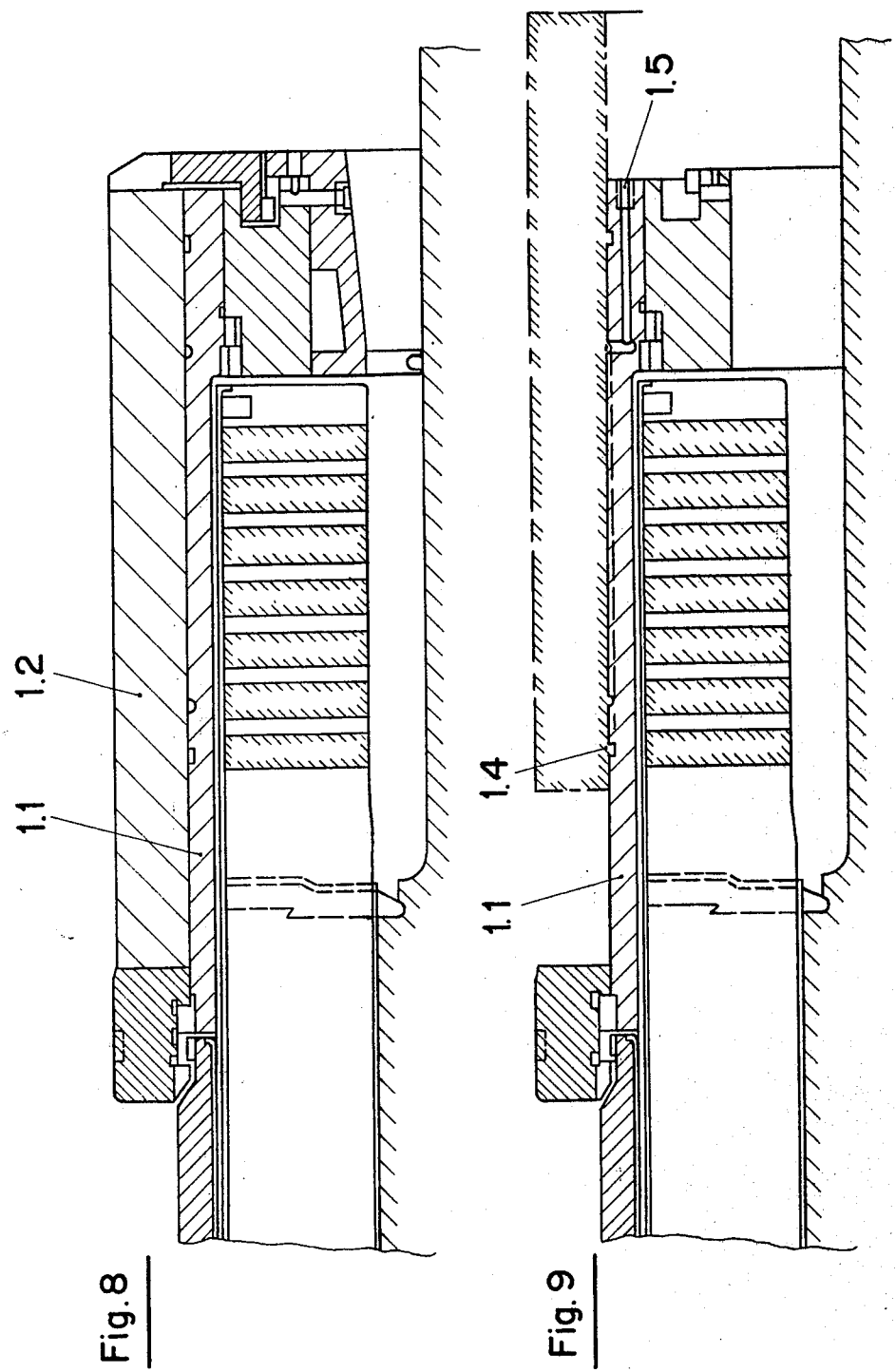

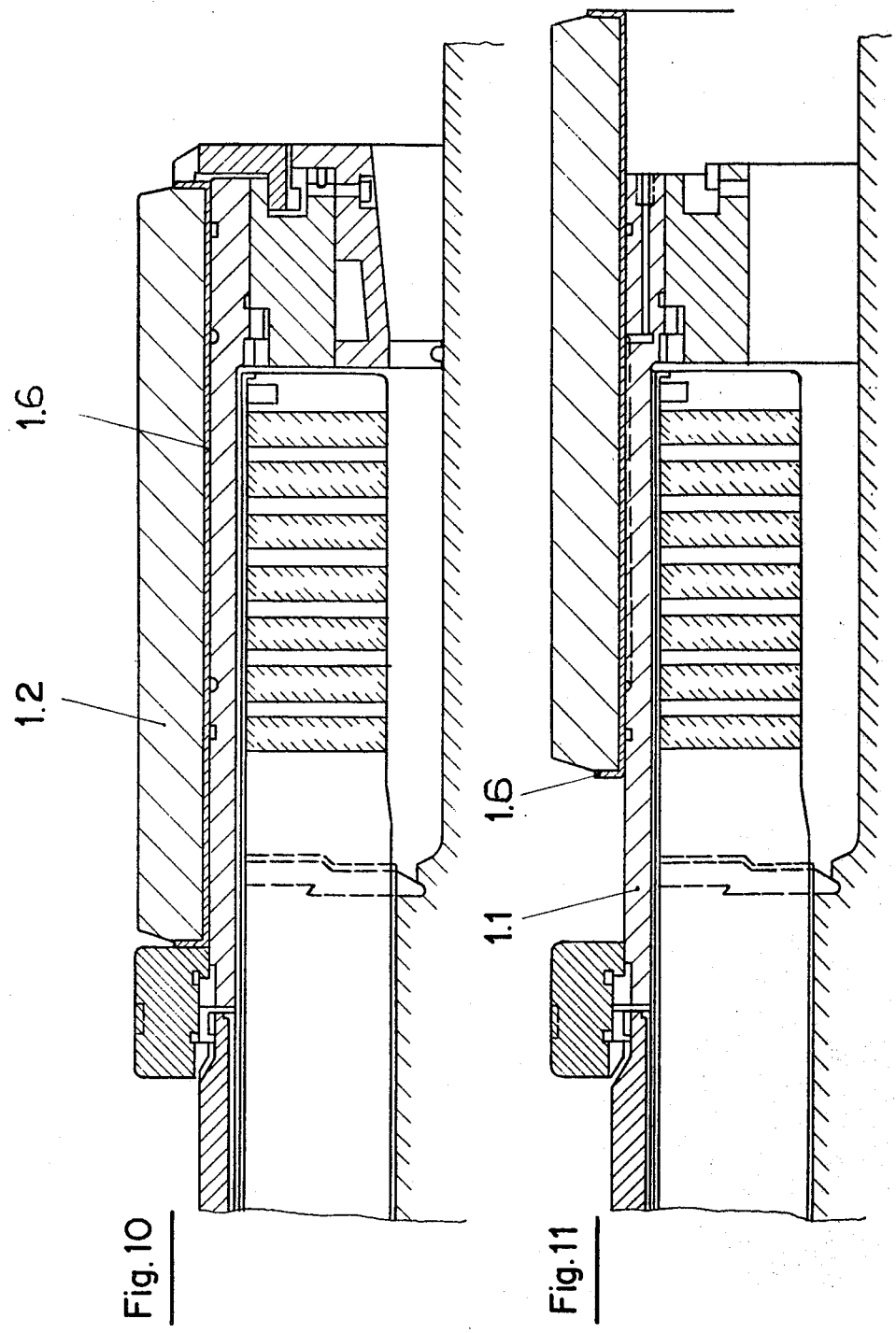

ROTOR END-WINDING SUPPORT FOR HIGH-SPEED ELECTRICAL MACHINE SUCH AS A TURBO-GENERATOR

This is a continuation of application Ser. No. 486,438 filed July 8, 1974, now abandoned.

The present invention concerns an improved construction for a rotor end-winding support for a high-speed electrical machine, in particular a turbogenerator, comprising an overhung rotor end bell of high-strength antimagnetic material surrounding the end-winding, one end of the bell being shrunk on the rotor body and the other end enclosing the shaft with a clearance. A support of this kind is known from the German published patent specification DT-OS 1 538 755, for example filed on Dec. 17, 1966.

The numerous known rotor end-winding supports with an overhung rotor and bell all consist of a heavy cylindrical ring having one end shrunk on the rotor body. The designs differ essentially in the manner of locating and fixing the end bells on the rotor body, this being achieved, for example, by spring rings or inserted threaded rings or braced ring sections. All known end bells serving as rotor end-winding supports, however, have the disadvantage that the solid ring absorbing the centrifugal forces of the end-winding is subjected to a substantial inherent loading due to the centrifugal force acting on its own mass.

The object of the invention is to improve the known forms of rotor end-winding support incorporating an overhung end bell, in particular to reduce their mass and hence the large centrifugal forces resulting from their own mass.

This object is achieved in that the end bell surrounding the end-winding comprises at least two concentric rings, the inner ring being shrunk on the end of the rotor body and secured against axial movement, and the outer ring enclosing the inner ring being fitted round the inner ring. The material of the component rings can be of different strengths. The inner ring is of less strength than the outer ring and constitutes the mechanically rigid connection to the rotor body by means of shrinkage and axial bracing. The outer ring is of much greater strength and absorbs the centrifugal forces due to the inner ring and its own mass. By dividing the end bell into a number of component parts it is possible to use combinations of materials, the respective component rings being allotted functions which correspond to their particular properties. This division into parts has advantages even with a steel/steel combination, as from the standpoint of cross-section and weight alone this offers advantages in forging, machining and installation. The quality of the material of each ring can also be matched to the respective stress conditions.

According to another version of the invention, the outer ring of the end bell is of greater strength than the inner ring. The inner ring, for example, can be of high-strength antimagnetic steel and the outer ring of a non-magnetic alloy having a high ratio of strength to specific weight. According to the invention the outer ring can be of titanium, for example.

The object of the invention can be achieved in a particularly advantageous manner in that the inner ring is of high-strength antimagnetic shrinkable steel and the outer ring a is made from a non-metallic material which cannot be expanded by heating such as carbon-fibre-reinforced material. In this case the ring of carbon-fibre-reinforced material can be strengthened on its inner surface by means of a sheet of non-magnetic metal. It is also possible to divide the ring of carbon-fibre-reinforced material axially and graduate the fit of the individual rings.

The outer ring can be fitted as described above. In the case of a ring of carbon-fibre-reinforced material, however, it is preferable to expand the outer ring by hydraulic means. For this, the outer surface of the inner ring must be provided with the holes and slots necessary for introducing the hydraulic medium.

To secure the end bell, the surface of the inner ring facing the rotor body is provided with teeth which coincide with the slots in the rotor body. The junction between rotor body and inner ring is covered by a bayonet ring which can be inserted over the inner ring through the gaps between the teeth. The rotor body and inner ring are locked together by turning the bayonet ring through a distance of half the spacing between slots. The bayonet ring is also preferably of high-strength antimagnetic steel. There can then be a radial and axial shrink fit between the bayonet ring and the braced parts of the teeth. A similar arrangement for one-piece end bells is known from DGbm 1 753 706 filed in Germany on Aug. 3, 1956.

Figure 7:
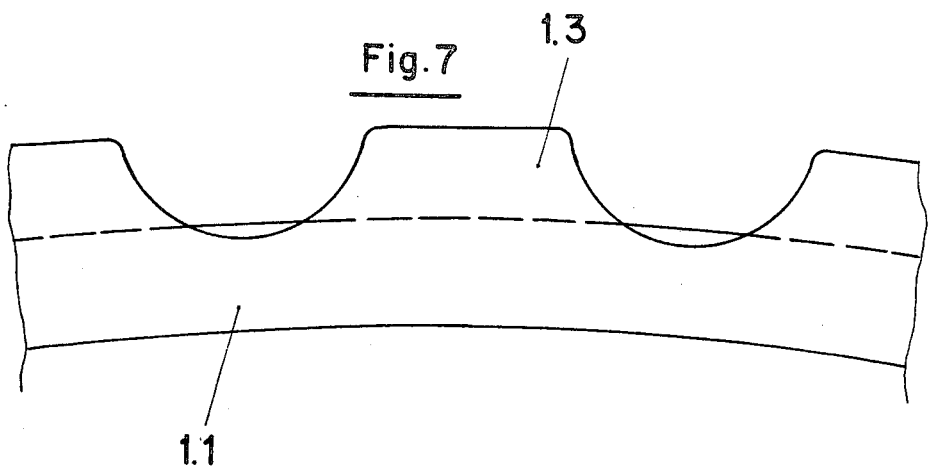

Further details and versions of the invention are described in the following and shown in the drawings, in which:

FIG. 1 shows a section through the end bell with the inner and outer ring and the bayonet ring, FIG. 2 shows the end bell without the outer ring, FIG. 3 is a detail of FIG. 1 showing the bayonet ring for axially securing the end bell to the rotor body in the fitted condition, FIG. 4 shows a cross-section of the bayonet ring with its teeth, FIG. 5 shows the end portion of the rotor body with end-bell seating and chamfered tooth for engaging the bayonet ring, FIG. 6 is an axial section through the bayonet ring and the rotor teeth showing the overlap of the teeth of the two parts, FIG. 7 shows the teeth at the end of the inner ring facing the rotor body through which the teeth of the bayonet ring are inserted on assembly, FIG. 8 shows a hydraulically fitted ring of carbon-fibre-reinforced reinforced material, together with slots on the surface of the inner ring, FIG. 9 shows a ring of carbon-fibre-reinforced material while being fitted hydraulically, with holes in the inner ring for introducing a hydraulic medium, FIG. 10 shows a ring of carbon-fibre-reinforced material strengthened by non-magnetic material on the inner surface, in the assembled condition, and FIG. 11 shows a ring of carbon-fibre-reinforced material strengthened by non-magnetic material on the inner surface, during assembly.

In the drawings, the end bell is denoted 1, the inner ring 1.1 and the outer ring 1.2. A further ring shrunk on to the inner ring 1.1 of the end bell, termed the bayonet ring, is denoted 2. Rotor body 3 has rotor teeth 3.1. The inner ring 1.1 is provided with teeth 1.3 which have the same pitch as the rotor teeth 3.1. When assembled, therefore, each tooth of teeth 1.3 is opposed by one of the rotor teeth 3.1. The two are axially braced together by way of tooth extensions 2.1 and the shoulder 2.2 of the bayonet ring 2.

The inner ring 1.1 is also shown to incorporate surface slots 1.4 and bores 1.5 through which a pressure medium is admitted for purposes of hydraulic fitting. With this form of fitting a hydraulic fluid, e.g. oil, is introduced and exerts pressure on ring 1.2 to expand it so that it can be slid on inner ring 1.1 at the rotor-body end without heating.

A sheet 1.6 of non-magnetic metal between the outer ring 1.2 and the inner ring 1.1 for reinforcing the inner surface of the outer ring 1.2 is illustrated in FIGS. 10 and 11.

I claim:

1. In a rotor end-winding support for a high-speed electrical machine, such as a turbogenerator, an overhung rotor end bell structure surrounding said end-winding comprising an inner cylindrical ring extending over the entire axial length of said end winding and which is made from a high strength but easily machineable and shrinkable antimagnetic metallic material, one end of said inner ring being shrunk onto the body of the rotor at the axially inner end of said end-winding and the other end thereof surrounding the rotor shaft with radial clearance, an outer cylindrical ring extending over the entire axial length of said inner ring, said outer ring being made from an antimagnetic material of higher strength than said inner ring and having a high ratio of strength to specific weight, means for introduction of a pressurized hydraulic fluid into the interface between said inner and outer rings for expanding said outer ring to a diameter enabling it to be fitted upon said inner ring, and means for interlocking the end of said inner ring at the axially inner end of said end-winding with said rotor body.

2. A rotor end-winding support as defined in claim 1 wherein said inner cylindrical ring is made from an antimagnetic steel and said outer ring comprises titanium.

3. A rotor end-winding support as defined in claim 1 wherein said inner cylindrical ring is made from an antimagnetic steel and said outer ring is made from a carbon-fiber-reinforced material.

4. A rotor end-winding support as defined in claim 3 and which further includes a sheet of non-magnetic metal disposed between said inner and outer cylindrical rings.

5. In a rotor end-winding support for a high-speed electrical machine, such as a turbogenerator, an overhung rotor end bell structure surrounding said end-winding comprising an inner cylindrical ring extending over the entire axial length of said end-winding and which is made from a high strength, machinable antimagnetic material, one end of said inner ring being contracted onto the body of the rotor at the axially inner end of said end-winding and the other end thereof surrounding the rotor shaft with radial clearance, and an outer cylindrical ring extending over the entire axial length of said inner ring and which is force-fitted onto said inner ring, said outer ring being made from an antimagnetic material of higher strength than said inner ring and having a high ratio of strength to specific weight, and means for interlocking the inner end said inner ring with said rotor body to prevent any displacement thereof in an axial direction, said interlocking means comprising a series of circumferentially spaced and axially extending teeth provided on the end of said inner ring in alignment with and braced against a similar arrangement of teeth provided on the rotor body by a lockable bayonet ring, the junction between the toothed portions of said inner ring and rotor body being covered by said bayonet ring having a similar arrangement of internal teeth and which is installed on said inner ring by passing the teeth on the bayonet ring through the gaps formed between the aligned teeth on the inner ring and rotor body into a position wherein a shoulder portion of said bayonet ring engages the teeth on said inner ring and the teeth on said bayonet ring engage the teeth on said rotor body, said bayonet ring then being rotated into locking position which is reached when the teeth on the bayonet ring are in abutment with the teeth on the rotor body.

6. A rotor end-winding support as defined in claim 5 wherein said bayonet ring is made from a high-strength antimagnetic steel.

7. A rotor end-winding support as defined in claim 5 wherein said bayonet ring is contracted radially and axially against the braced parts of said teeth.

8. A rotor end-winding support as defined in claim 1 wherein said means for introduction of a pressurized hydraulic fluid at the interface between said inner and outer rings for expanding said outer ring to a diameter enabling a fit upon said inner ring comprises fluid inlet bores communicating with surface slots in said inner ring.

* * * * *